United States Patent [19]
Chu et al.

[11] Patent Number: 6,150,014
[45] Date of Patent: Nov. 21, 2000

[54] COATED EXTERIOR MIRROR HOUSING FOR VEHICLES

[75] Inventors: Tun-Jen Chu; Desmond J. O'Farrell, both of Holland, Mich.

[73] Assignee: Donnelly Corporation, Holland, Mich.

[21] Appl. No.: 09/348,083

[22] Filed: Jul. 6, 1999

Related U.S. Application Data

[63] Continuation of application No. 08/680,176, Jul. 15, 1996, Pat. No. 5,942,324.

[51] Int. Cl.$^7$ ....................................................... B32B 5/16
[52] U.S. Cl. ........................... 428/324; 428/328; 428/335; 428/912.2
[58] Field of Search ..................... 428/323, 328, 428/324, 335, 412, 480, 912.2, 918

[56] References Cited

U.S. PATENT DOCUMENTS

| | | | |
|---|---|---|---|
| 4,514,464 | 4/1985 | Gomez | 428/335 |
| 5,514,466 | 5/1996 | Yamada et al. | 428/358 |
| 5,594,593 | 1/1997 | Milner . | |
| 5,686,188 | 11/1997 | Brandt et al. | 428/435 |
| 5,751,467 | 5/1998 | Byker . | |
| 5,801,873 | 9/1998 | Byker . | |

FOREIGN PATENT DOCUMENTS

| | | |
|---|---|---|
| 259064A1 | 3/1988 | European Pat. Off. . |
| 703275A1 | 3/1996 | European Pat. Off. . |
| 19543888A | 5/1996 | Germany . |
| 29704058 U | 5/1997 | Germany . |

OTHER PUBLICATIONS

Three (3) photographs of a 1992/1993 Chrysler LH automobile including molded exterior mirror housing having a black, high gloss, uncoated, unpainted surface on sale in the United States for more than one year prior to the filing date of the present application.

British Patent Office Search Report dated Sep. 26, 1997, from application Serial No. GB 9714327.5.

*Primary Examiner*—H. Thi Le
*Attorney, Agent, or Firm*—Van Dyke, Gardner, Linn & Gardner, LLP

[57] ABSTRACT

A coated housing for exterior rearview mirrors for vehicles provides increased gloss and depth of color in appearance, and enhanced resistance to scratching, surface crazing and ultraviolet radiation degradation. The housing is preferably molded from a resinous plastic material in a predetermined color and has a generally transparent polymeric material such as clear urethane or acrylic applied in a thin coating to the unpainted housing. The generally transparent coating may include a tint or particles of metal or mica to enhance the molded housing color and/or appearance. Optionally, adhesion of the coating to the housing may be increased by mixing an adhesion promoting agent in said resinous plastic material prior to molding, or by treating the housing surface after molding and prior to application of the coating. An ultraviolet radiation absorbing, blocking, screening material may be included in the generally transparent polymeric material. A method for making the coated exterior rearview mirror housing is also disclosed.

43 Claims, 2 Drawing Sheets

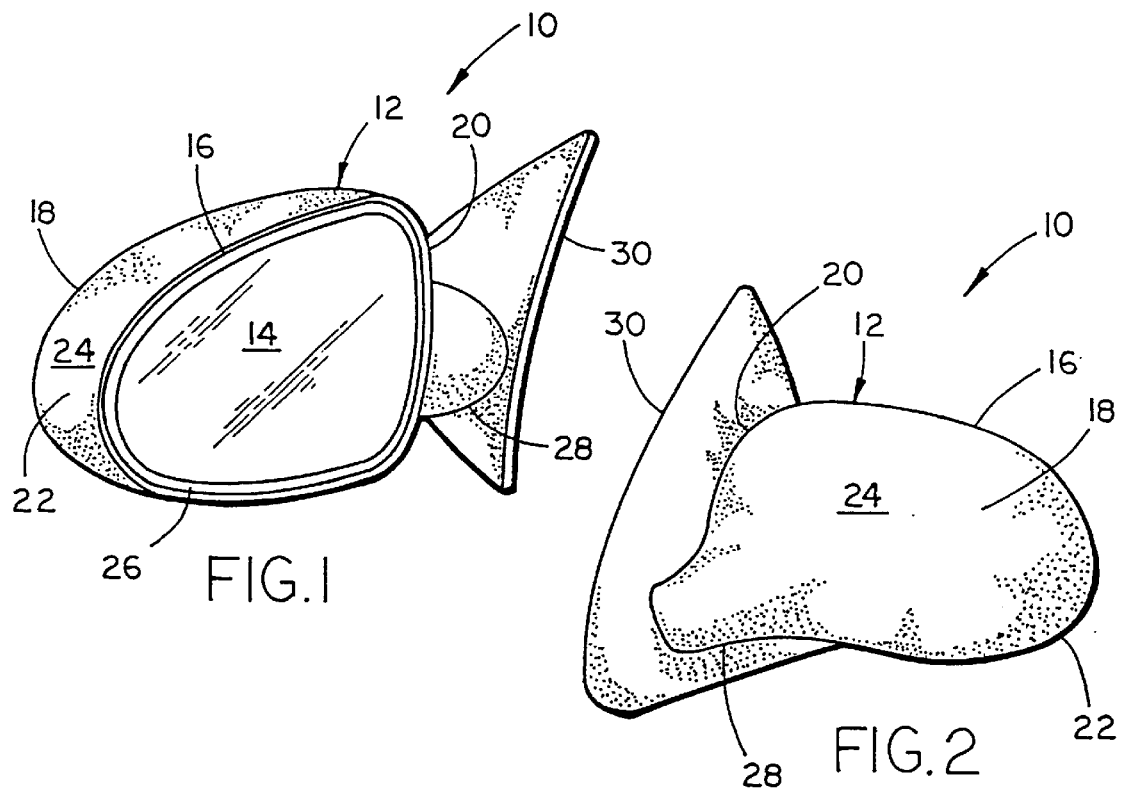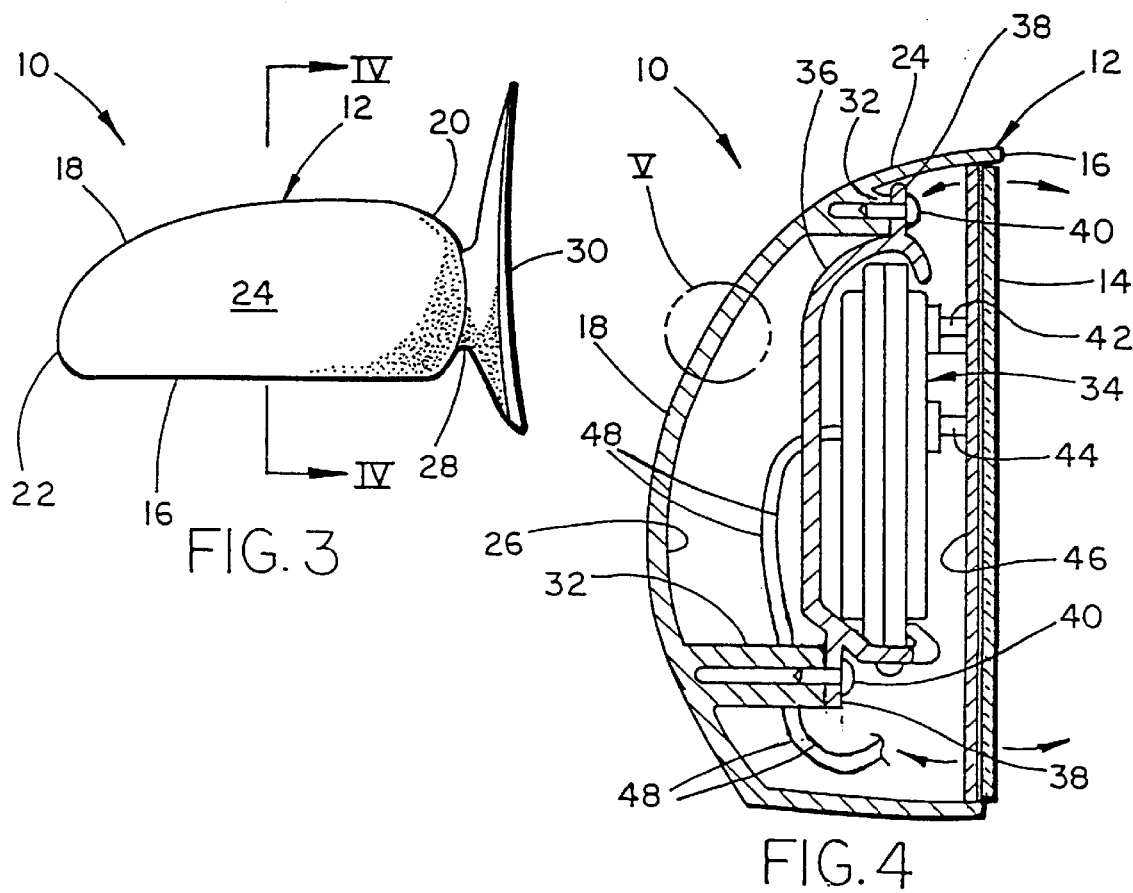

COATED EXTERIOR MIRROR HOUSING FOR VEHICLES

CROSS REFERENCE TO RELATED APPLICATION

This is a continuation of commonly-assigned application Ser. No. 08/680,176, filed Jul. 15, 1996 now U.S. Pat. No. 5,942,324, of Tun-Jen Chu and Desmond J. O'Farrell for COATED EXTERIOR MIRROR HOUSING FOR VEHICLES AND METHOD FOR MAKING SAME, the disclosure of which is hereby incorporated by reference herein.

FIELD OF THE INVENTION

This invention relates to housings for exterior rearview mirrors for vehicles and, more particularly, to an improved, coated housing for exterior rearview mirrors on vehicles which provides enhanced appearance, mechanical property retention and durability through an improved coating method wherein a generally transparent polymeric material is applied directly to an unpainted, molded resinous plastic housing.

BACKGROUND OF THE INVENTION

Conventional vehicular exterior mirror housings may be stamped from metal and painted for protection against the elements or molded from thermoplastic or thermosetting resins and painted black or to match the color of the vehicle body. In addition, certain prior known molded exterior rearview mirror housings include an in-molded black pigment but are otherwise unpainted and uncoated.

With reference to FIG. 8, the typical prior art decorative painting of a vehicular exterior rearview mirror housing A includes a series of layers including a primer layer B, a base or color coat layer C and a clear coat layer D. The paint compositions can be one or two component polyurethanes or acrylics in a typical assembly. Prior to painting, the molded resinous plastic housing is cleaned and dried. The cleaned housing surface is then sprayed with a primer B and allowed to cure. The primer layer improves adhesion of the subsequently applied color coat on the substrate housing A, and/or provides conductivity for electrostatic spraying of subsequent layers. The base or color coat C which contains pigment is applied over the primer B, the thickness depending on the hiding strength of the pigment therein. The base coat C is followed by a final clear coat D typically applied wet on wet over the base coat and again allowed to cure.

The above painting process is lengthy, time consuming, and adds significant expense to the manufacture of the mirror housing, regardless of whether the housing is metal or plastic. For example, extra materials are required, along with additional labor for painting and quality control, while process yields are typically less than 100% and result in additional losses. The painting process also requires a significant amount of capital equipment and dedicated factory floor space which itself adds further expense. Further, additional energy to accomplish the painting process is required along with emission control and waste recovery equipment which is closely monitored by government agencies to prevent the escape of volatile emissions from the paint. Compliance often requires significant additional capital for vapor recover systems.

On the other hand, unpainted, molded resinous exterior rearview mirror housings, when used in the harsh environment to which the typical vehicle is exposed, are susceptible to ultraviolet radiation degradation and weather affects such as crazing and cracking from the sun and temperature variations, scratching and abrasion in normal use, as well as attack from chemicals present in the atmosphere and vehicular fluids. This results in a housing whose appearance is reduced over time.

The present invention provides a coated exterior rearview mirror housing which overcomes the above problems of both painted, molded or metal exterior rearview mirror housings as well as unpainted, molded resinous mirror housings.

SUMMARY OF THE INVENTION

Accordingly, the present invention provides a coated housing for exterior rearview mirrors for vehicles which is adapted to provide enhanced appearance and increased mechanical properties and durability through the use of a coating of generally transparent polymeric material applied directly to at least a portion of the unpainted, outside housing surface. The invention eliminates the need for any intermediate paint or pigmented layer while providing excellent adherence of the coating to the molded housing. The result is an improved coated housing having increased gloss and depth of color in appearance, and enhanced resistance to scratching, surface crazing and ultra-violet radiation degradation. However, processing time, expense and complexity is reduced as compared with painting because of the simplified coating process and reduced number of coating layers.

In one aspect of the invention, a coated housing for exterior rearview mirrors for vehicles is provided including a molded housing having outside and inside surfaces where the outside surface is exposed and visible from the vehicle exterior. The housing is adapted to house a reflective rearview mirror element when mounted on a vehicle. The housing is molded from a resinous plastic material of a predetermined color and is unpainted. A coating of generally transparent polymeric material is applied directly to at least a portion of the outside housing surface. The coated outside housing surface portion has at least one of enhanced scratch resistance, enhanced resistance to surface crazing, increased resistance to ultra-violet radiation degradation, and increased gloss and depth of color in appearance.

In preferred forms of the invention, the coating is a thin, generally clear layer of urethane or acrylic applied in a thickness within the range of between about 25 to 50 microns. Preferably, the resinous plastic material of the molded housing is selected from the group including polycarbonate/polyethylene terephthalate blends, acrylonitrile butadiene styrene copolymer, acrylonitrile/styrene/acrylate, and nylon. The resinous plastic material may include an adhesion promoting agent such as a bisphenol derivative mixed therein prior to molding to provide increased adhesion of the transparent coating to the housing.

Alternately, in other aspects of the invention, the outside surface of the housing may be treated after molding but before application of the generally transparent polymeric coating to enhance adhesion of the coating when applied. Such treatments may include corona surface treatment, plasma surface modification, or chemical surface treatment.

In yet other aspects of the invention, the generally transparent coating may include a tint compound or pigmentation in a desired color to enhance the color of the resinous plastic material. Preferably, such tint is matched to the color of the resinous plastic material of the housing to increase the gloss and depth of color in appearance. Alternately, the transparent coating may include a plurality of particles dispersed therein to enhance the appearance of the coated housing, such particles preferably comprising flakes of material selected from metal or mica. While the metal flakes may be aluminum, other ferromagnetic metals may be used such that the flakes can be oriented in a predetermined pattern such as parallel to the housing surface using magnetic force prior to final curing of the transparent coating. In addition, the molded resinous plastic material of the housing may itself include a plurality of particles or flakes of material mixed therein prior to molding such that those particles will be visible in the outside surface after molding for enhancement by the generally transparent coating. Further, the generally transparent coating may include an ultraviolet radiation absorbing, blocking or screening additive to resist ultraviolet radiation degradation of the resinous plastic of the housing. Such additives may include, for example, benzotriazole-type materials for urethane or 2 hydroxy phenyl benzotriazole for acrylics.

In yet another aspect of the invention, a method for making a coated housing for exterior rearview mirrors for vehicles comprises molding a housing in a predetermined configuration from a resinous plastic material of a predetermined color and applying a coating of generally transparent polymeric material directly to at least a portion of the unpainted, outside surface of the molded housing whereby a coated housing results which has at least one of enhanced scratch resistance, enhanced resistance to surface crazing, increased resistance to ultra-violet radiation degradation, and increased gloss and depth of color in appearance.

Preferably, the method includes spraying a thin, generally clear layer of urethane or acrylic on the outside surface of the molded housing to form the coating. A tint compound containing a desired pigment may be mixed in the generally transparent polymeric material prior to application. Alternately, a plurality of particles or flakes of metal, mica or the like may also be mixed in the generally transparent polymeric material prior to application. If made from a ferromagnetic metal, those particles may be oriented in a desired array using magnetic force prior to final set up or cure of the generally transparent coating.

Adhesion of the generally transparent coating to the molded housing may be increased by inclusion of an adhesion promoting agent such as a bisphenol derivative in the resinous plastic material prior to molding. Alternately, the outside surface of the molded housing may be treated to modify the surface and increase the adhesion of the generally transparent coating thereto using a treatment selected from the group including corona surface treatment, plasma surface modification and chemical surface treatment. An ultraviolet radiation absorbing, blocking or screening material may be added to the generally transparent polymeric material prior to application.

Accordingly, the coated exterior rearview mirror housing of the present invention provides numerous advantages over prior known painted exterior rearview mirror housings for vehicles as well as prior known, molded, black housings which include no coating or painting of any type. The generally transparent coating is thoroughly adhered to the molded housing either through the selection of compatible resinous plastic materials and coatings or through the use of adhesion enhancement methods such as mixing of adhesion promoting agents in the resinous plastic material prior to molding, or treatment of the surface of the molded housing prior to coating with the generally transparent polymeric material using corona surface treatment, plasma surface treatment, or chemical surface treatment. The coated housing provides enhanced durability and mechanical property retention including one or more of enhanced scratch resistance, enhanced resistance to surface crazing and increased resistance to ultra-violet radiation degradation. The coating itself may provide the ultra-violet radiation resistance, especially through the use of UV absorbers, blockers or screening additives, while less expensive, less stable resinous plastic material may be used to form the molded housing thereby lowering the overall cost of the assembly. The generally transparent coating itself increases the gloss and depth of color in appearance of the precolored molded housing. Such appearance can be enhanced by including tint or pigmentation compounds in the transparent coating, or particles or flakes of metal or mica which themselves may be oriented as desired prior to cure of the transparent coating such as through the use of magnetic force. When the tint is matched to the underlying molded housing, the depth of color is significantly enhanced. Further, particles of metal or mica may be mixed within the resinous plastic material from which the molded housing is made so as to be visible in the outside surface after molding. Such appearance can be further enhanced through the dispersion of metal or mica flakes within the generally transparent polymeric coating as noted above. Thus, the present coated housing for exterior rearview mirrors for vehicles provides increased durability and mechanical property retention and enhanced appearance.

These and other objects, advantages, purposes and features of the inventions will become more apparent from a study of the following description taken in conjunction with the drawings.

BRIEF DESCRIPTION OF THE DRAWINGS

FIG. 1 is a perspective view of an exterior rearview mirror assembly for vehicles incorporating a first embodiment of the coated housing of the present invention;

FIG. 2 is a rear perspective view of the exterior rearview mirror assembly for vehicles including the coated housing shown in FIG. 1;

FIG. 3 is a top plan view of the exterior rearview mirror assembly for vehicles including the coated housing shown in FIGS. 1 and 2;

FIG. 4 is an enlarged, sectional, end elevation of the exterior rearview mirror assembly taken along plane IV—IV of FIG. 3 illustrating a typical interior construction of the exterior rearview mirror assembly which incorporates the coated housing of the present invention;

DESCRIPTION OF THE PREFERRED EMBODIMENTS

Figure 5:
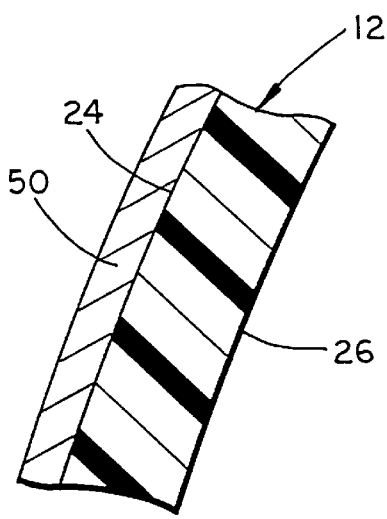
FIG. 5 is an enlarged, fragmentary, sectional view of a portion of the coated housing of FIGS. 1–4 taken in area V of FIG. 4.

Referring now to the drawings in greater detail, FIGS. 1–4 illustrate a first embodiment 10 of an exterior rearview mirror assembly for vehicles such as automobiles and light trucks. Assembly 10 incorporates a molded, resinous plastic housing 12 adapted to at least partially cover a reflective rearview mirror element 14 having a peripheral configuration adapted to fit within the rearwardly facing opening of the housing 12 which is defined peripheral rim 16 of the housing. Mirror element 14 may be of conventional design and include a metallic or metallic alloy reflective layer, or may be an electro-optic element such as an electrochromic element which darkens to reduce reflection of glare producing light in response to the application of an electrical voltage. Housing 12 is typically injection molded in one piece and includes a solid, imperforate, forward facing rear wall 18, inner and outer ends 20, 22 and exterior or outside and interior or inside surfaces 24, 26. Typically, housing 12 will include a reduced size neck or mounting portion 28 adapted to be fixedly or pivotally secured to an attachment plate 30 known as a "sail" or mirror base which is adapted for attachment to the front lower corner of the driver or passenger side window opening in the driver or passenger door of the vehicle. In this way, mirror assembly 10 is positioned adjacent the vehicle side for viewing by the driver of objects to the side and rear of the vehicle. Alternately, housing 12 could be attached to other supports or portions of the vehicle. Housing 12 is preferably aerodynamically shaped such that the wind stream passing the vehicle will flow smoothly over the rear surface 18 and past the peripheral edge 16 of the mirror housing without undue turbulence. Likewise, the solid, imperforate outside surface of the mirror housing protects the interior and mirror element 14 from the wind and the elements, but is subject to the effects of those elements.

As is best seen in FIG. 4, housing 12 includes a series of upstanding projections or bosses 32 on interior surface 26. Bosses 32 project outwardly from the interior rear surface 26 toward the opening defined by peripheral rim 16. An electric actuator assembly 34, having a mounting base 36, is secured within the interior of housing 12 via flanges 38 via threaded fasteners 40 passed therethrough and into appropriate apertures in the free end surfaces of extending bosses 32. Actuator 34 includes one or more electric motors adapted to extend and retract mounting post 42 about central pivot 44 so as to pivotally adjust the position of mirror element backing plate 46 to which reflective mirror element 14 is adhered. A wire harness including electric wiring 48 connected to the actuator assembly 34 extends withing the housing and is typically passed through the mounting neck 28 and attachment plate 30 to the interior of the vehicle for connection to the vehicle electrical system and an appropriate control switch or the like. When operated, actuator 34 allows pivotal adjustment of the position of the backing plate 46 and attached reflective mirror element 14 such that the field of view for the driver of the vehicle is appropriate and traffic and other objects to the rear of the vehicle can be easily viewed.

Figure 8:
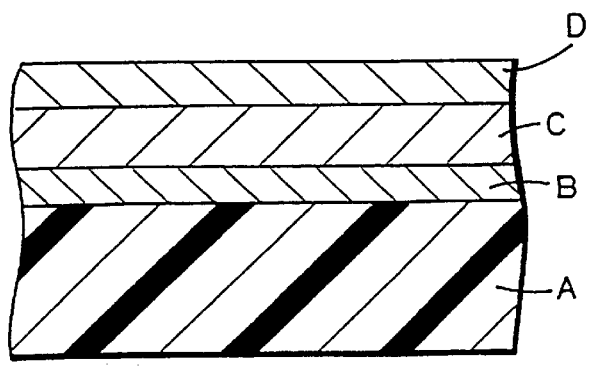
FIG. 8 is an enlarged, fragmentary, sectional view of a conventional, prior known, exterior rearview mirror housing for vehicles which is painted with multiple coating layers on its outside surface as described in the Background of the Invention herein.

As shown in FIGS. 4 and 5, housing 12 The transparent polymeric material has a refractive index in the range of about 1.35 to about 1.67 measured at the sodium D line and 20° C. is preferably injection molded from a pre-colored, resinous plastic material and covered with a thin coating or layer 50 of generally transparent polymeric material such as generally clear urethane or acrylic on outside surface 24 over at least a portion of the housing. Coating 50 enhances the mechanical property retention and durability of the housing by increasing one or more, and preferably all of, scratch resistance, resistance to surface crazing, and resistance to ultra-violet radiation degradation, as well as providing increased gloss and depth of color in appearance for the pre-colored resin of housing 12. In a preferred embodiment of coated housing 12, the resinous plastic material from which the housing is molded is selected to be compatible and provide excellent adhesion with the generally transparent polymeric material from which coating 50 is formed. Preferably, such resinous material of the housing is a polycarbonate/polyethylene terephthalate blend such as Makroblend UT403 from Bayer Corporation of Pittsburgh, Pa. Alternately, acrylonitrile butadiene styrene copolymer, acrylonitrile/styrene/acrylate such as LURANE S from BASF Corporation of Wyandotte, Mich., or nylon may be used to mold housing 12. The preferred generally transparent polymeric material of coating 50 is a generally clear, exterior urethane, preferably R788 Clear Coat from Morton Automotive Coatings of Lansing, Ill. Coating 50 typically has a thickness within the range of between about 25 to 50 microns and, most preferably within the range of 30 to 35 microns. Coating 50 is preferably applied in liquid or semi-liquid form by spraying directly on the outside, unpainted surface of the molded housing 12 at about 60 psi followed by baking at about 176° Fahrenheit (80° Centigrade) after which the coated parts are allowed to dry and cure for approximately 72 hours at room temperature. For purposes of the present invention, unpainted means that no painting operation as is commonly known in the vehicular/automotive painting arts and as is described above in the Background of the Invention in conjunction with FIG. 8 is used. A second coat of R788 Clear Coat can be applied within about 60 seconds after the first coat if desired for additional thickness and protection. When applied to the surface of a housing 12 molded from polycarbonate/polyethylene terephthalate blend such as Makroblend UT403, the R788 Clear Coat has been found to have excellent adherence to the housing surface, and provide excellent resistance to environmental degradation and etching, increased physical performance and retention of mechanical properties such as scratch resistance and resistance to surface crazing, as well as resistance to ultra-violet radiation degradation resulting from prolonged exposure to sunlight which could otherwise impair the strength and durability of the underlying resinous materials. In addition, the R788 Clear Coat urethane enhances the gloss of the molded housing when viewed from the exterior while increasing the depth of color appearance of the resinous material from which housing 12 is formed. As will be understood, the resinous plastic materials such as Makroblend UT403 may include pigments to provide the molded housing with a desired color adapted to match the body color of the vehicle to which the mirror assembly will be attached. Coating 50 enhances the depth of color of the molded housing 12 regardless of which pigment is included in the resinous plastic material from which the housing is made.

Alternately, coating layer 50 may be formulated to include ultraviolet radiation absorbing, blocking or screening stabilizers or additives selected from the group including benzophenones, cinnamic acid derivatives, esters of benzoin acids, salicylic acid, terephthalic and isophthalic acids with resorcinol and phenols, pentamethyl piperidine derivatives, salicylates, benzotriazoles, cyanoacrylates, benzilidenes, malonates and oxalanilides which may also be combined with nickel chelates and hindered amines. These additives stabilize the resinous mirror housing itself against ultraviolet degradation. Typically, for a urethane-based coating, a benzotriazole-type UV stabilizer may be used. For an acrylic based coating, a UV additive such as 2 hydroxyphenylbenzotriazole may be used. A clear, transparent coating packed with UV blockers/filters/absorbers may be painted or sprayed onto the resinous mirror housing. For example, UV blockers/filters/absorbers are added to the coating such as CYASORB™ UV1084 or UV5411, available from American Cyanamid of Stamford, Conn., or any suitable material drawn from known UV blockers up to concentrations close to their solubility limit. CYASORB™ UV5411 is a benzotriazole while CYASORB™ UV1084 is an organo-nickel complex or nickel chelate. The coating can then be sprayed, painted or dipped onto, for instance, on the resinous mirror housing for added resistance to UV degradation.

For additional appearance effect, the resinous plastic material from which housing 12 is molded may include particles of metal or mica mixed into the resin prior to molding to provide a metallic effect or appearance on the outside surface of the housing. Suitable particles or flakes of metal or mica may be obtained from Ferro Corporation of Cleveland, Ohio. The particles or flakes may be formed from metal such as aluminum or other metals, including ferromagnetic metals, as well. Coating 50 thus enhances the appearance of the metallic effect visible on the outside surface of housing 12 when such particles are included.

In the event increased adhesion of the transparent polymeric material coating 50 is desired, an adhesion promoting agent may also be mixed in the resinous plastic material from which housing 12 is molded prior to the molding step. A suitable adhesion promoting agent is a bisphenol derivative available from Bayer AG of Germany. Such adhesion promoting agent contains functional groups which improve the bond of the resultant coating to housing 12 after cure. Other adhesion promoting agents include aminosilane available from OSi Specialties Inc. of Connecticut which may also be mixed individually in the resinous plastic material for housing 12 prior to molding.

Additional adhesion enhancement of coating 50 to the outside surface of housing 12 may also be accomplished by surface treatment or modification of the housing surface 24 after molding regardless of whether the housing 12 includes an adhesion promoting agent in the resin from which it is molded. These surface treatments or modifications include corona surface treatment, plasma surface modification and chemical surface treatment, all of which are conventionally known processes.

Corona surface treatment is a process in which a large, high frequency electrical field ionizes and excites components of the air such as oxygen ($O_2$) creating a corona which contains positive, negative, and neutral species. These species impact the electrostatically charged substrate surface causing chemical changes which improve surface energy and bonding.

Plasma surface technology includes the use of synthetic gaseous plasmas comprising mobile, positively and negatively charged particles which interact with the surface of the housing. Various types of gaseous plasmas may be used such as inert gas plasmas of helium, neon, argon or krypton, as well as oxygen and hydrogen plasmas, all depending on the type of resinous polymer in use. Likewise, other polymers are better treated with organosilane plasmas. In such treatment, the molded housings would be inserted in an enclosure in which the gaseous plasma is formed such that at least the exterior surface of the housing is modified by engagement with the plasma for a predetermined period of time.

Chemical surface treatment includes the application of chemical agents such as hydrochloric acid (HCL), hydrosulphuric acid ($H_2SO_4$), or other acids or bases to the surface of the molded housing for a predetermined period of time to improve surface energy and bonding. This also modifies the outside surface 24 of housing 12 for better acceptance and adhesion of coating 50. As mentioned above, these treatment methods may be used with mirror housings molded from resinous plastic materials or polymers which may optionally include adhesion promoting agents such as those described above, although such agents are not absolutely necessary.

Figure 6:
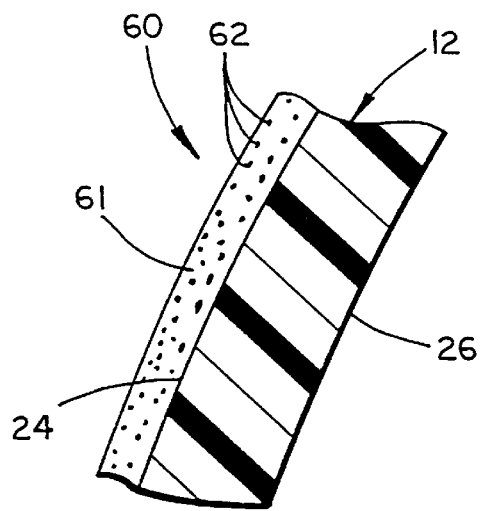
FIG. 6 is an enlarged, fragmentary, sectional view of an alternate embodiment of the coated housing for use in the mirror assembly such as that shown in FIGS. 1–4.

As shown in FIG. 6, the appearance of the coated exterior rearview mirror housing 12 may be enhanced by including particles or flakes of metal, mica or other materials dispersed within the transparent polymeric material when applied as a liquid or semi-liquid to form the coating on the outside surface of the housing. Housing embodiment 60 includes a thin coating 61 of a thickness similar to that for coating 50 having particles 62 of aluminum, other metals or mica which are mixed within the polymeric material when sprayed or otherwise applied to the housing 12. In the event particles 62 are formed from ferromagnetic metal or material, a magnetic force may be applied to the coated housing prior to final cure or set up of coating 61 so as to orient the particles uniformly within the coating layer. Such orientation is typically parallel to the exterior surface 24 of housing 12 to thereby enhance the appearance and metallic effect from the particles. Coating 61 with particles or flakes 62 may be used with resinous polymeric materials from which housing 12 is formed which themselves may include particles or flakes of metal or mica as described above. In such case, the particle containing coating 61 will further enhance the metallic effect of the metallic appearance of the housing 12.

Figure 7:
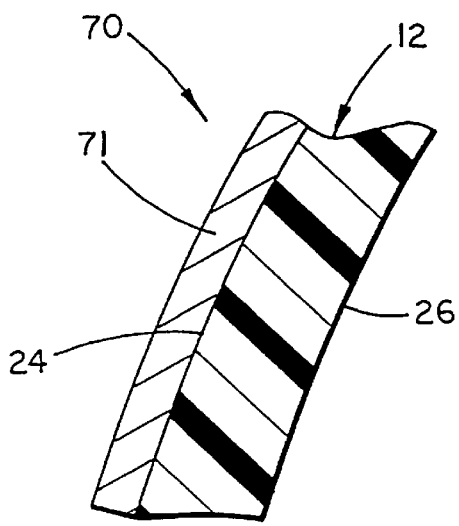
FIG. 7 is an enlarged, fragmentary, sectional view of yet another embodiment of the coated housing adapted for use in an exterior rearview mirror assembly such as that shown in FIGS. 1–4.

As shown in FIG. 7, yet another alternative form 70 of the coated housing of the present invention includes a thin coating 71 of generally transparent polymeric material such as generally clear urethane or acrylic within which is mixed a tint of a desired color comprising a pigmentation compound. The tint of coating 71, which is typically applied as a liquid or semi-liquid in the thickness range like that of coating 50, may be selected to enhance the color of the underlying outside surface 24 of housing 12 and, preferably, is matched to the color of the housing so as to both increase the gloss of the housing as well as the depth of color appearance of the housing. Suitable tint compounds typically contain similar pigments as traditional base or color coat materials. Such pigments vary by color and are commercially available from Morton Automotive Coatings of Lansing, Ill. These tint compounds are mixed in the liquid transparent polymeric material prior to spraying or other application and are, thus, thoroughly dispersed within the coating to provide the enhanced appearance noted above. The tinted coating 71 may be used with any of the housings including those having adhesion promoting agents mixed within the resinous polymeric material of the housing, as well as housings including modified outside surfaces formed with treatments such as corona surface treatment, plasma surface modification or chemical surface treatment, or with housing materials incorporating metal, mica or other particles or flakes to provide a metallic appearance. Likewise, particles such as those shown at 62 in FIG. 6 may also be mixed or dispersed within the coating 71 including the desired tint compound such that the coating 71 may simultaneously provide both an enhanced color appearance as well as an enhanced metallic effect.

The preferred method for manufacturing the coated housing for exterior rearview mirrors for vehicles includes molding a housing in a predetermined configuration from a resinous plastic material such as that described above which has a predetermined color. Thereafter, a coating of generally transparent polymeric material such as generally clear urethane or other material as described above is applied directly to at least a portion of the outside, unpainted surface of the molded housing. The coated housing provides enhanced durability and mechanical property retention including one or more of, and preferably all of, resistance to scratching, resistance to surface crazing, resistance to ultra-violet radiation degradation and increased gloss and depth of color in appearance. Preferably, the coating is applied by spraying a thin layer of the transparent polymeric material on the outside surface, although tint compounds or a plurality of particles or flakes of metal, mica or other materials such as UV radiation absorbers, blockers, or screening agents as described above may be mixed within the generally transparent polymeric material in liquid form prior to spraying and curing. In the event the particles are those of a ferromagnetic material, they may be oriented to enhance the appearance of the final coating prior to cure using magnetic force. In addition, the method includes enhancing the adhesion of the thin coating of generally transparent polymeric material by mixing an adhesion promoting agent in the resinous plastic material of the housing prior to molding. Alternately, or in addition to the adhesion promoting agent in the resinous polymeric material, at least the outside surface of the molded housing may be treated after molding and before application of the transparent coating to further enhance adhesion. Such surface modifying treatments may include corona surface treatment, plasma surface modification and chemical surface treatment as described above. Likewise, particles or flakes of metal, mica or other materials may be mixed within the resinous plastic material of the housing prior to molding to provide an enhanced metallic effect which itself is further enhanced by the application of the thin generally transparent coating to the outside surface. The generally transparent coating may itself include additional particles or flakes of metal, mica or other materials, as well as pigmentation compounds to provide a tint which enhances the color of the underlying housing.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow interpreted in accordance with the principles of patent law including the Doctrine of Equivalents.

The embodiments of the invention in which an exclusive property or privilege is claimed are defined as follows:

1. A coated housing for exterior rearview mirrors for vehicles comprising:
   a molded housing having an outside surface and an inside surface, said outside surface being exposed and visible from the vehicle exterior, said housing being adapted to house a reflective rearview mirror element when mounted on a vehicle, said housing being molded from a resinous plastic material of a predetermined color and being unpainted; and
   a coating of transparent polymeric material on at least a portion of said outside housing surface, said transparent polymeric material having a refractive index from about 1.35 to about 1.67 measured at the sodium D line and at 20° C., and having incorporated therein at least one ultraviolet radiation absorbing, blocking or screening additive to resist ultraviolet radiation degradation of said resinous plastic material of said housing, whereby said coated outside housing surface portion of said exterior rearview mirror has at least one of enhanced scratch resistance, enhanced resistance to surface crazing, increased resistance to ultraviolet radiation degradation, increased gloss and increased depth of color in appearance as compared to said housing when uncoated with said coating.

2. The coated housing of claim 1 wherein said coating has a thickness in the range of between about 25 to 50 microns.

3. The coated housing of claim 2 wherein said resinous plastic material of said housing is selected from the group consisting of polycarbonate/polyethylene terephthalate blend, acrylonitrile butadiene styrene copolymer, acrylonitrile/styrene/acrylate, and nylon.

4. The coated housing of claim 2 wherein said resinous plastic material includes a plurality of particles mixed therein prior to molding, said particles being visible in said outside surface after molding such that the metallic appearance of said coated housing is enhanced.

5. The coated housing of claim 2 wherein said resinous plastic material includes an adhesion promoting agent mixed therein prior to molding of said housing, said agent providing increased adhesion of said transparent coating to said housing.

6. The coated housing of claim 2 wherein said exterior surface of said housing is treated after molding but before application of said transparent polymeric coating to enhance adhesion of said coating to said outside surface.

7. The coated housing of claim 1 wherein said resinous plastic material includes an adhesion promoting agent mixed therein prior to molding of said housing, said agent providing increased adhesion of said transparent coating to said housing.

8. The coated housing of claim 7 wherein said adhesion promoting agent comprises a bisphenol derivative.

9. The coated housing of claim 1 wherein said ultraviolet radiation absorbing, blocking or screening additive comprises a benzotriazole.

10. The coated housing of claim 1 wherein said outside surface of said housing is treated after molding but before application of said transparent polymeric coating to enhance adhesion of said coating to said outside surface.

11. The coated housing of claim 1 wherein said outside surface is modified prior to application of said transparent coating using a treatment selected from corona surface treatment, plasma surface modification, and chemical surface treatment.

12. The coated housing of claim 1 wherein said transparent coating includes a tint of a desired color whereby the appearance of the color of said resinous plastic material is enhanced.

13. The coated housing of claim 12 wherein said tint has the color of said resinous plastic material of said housing.

14. The coated housing of claim 13 wherein said tint is provided by a pigmentation.

15. The coated housing of claim 1 wherein said resinous plastic material of said housing is selected from the group consisting of polycarbonate/polyethylene terephthalate blend, acrylonitrile butadiene styrene copolymer, acrylonitrile/styrene/acrylate, and nylon.

16. The coated housing of claim 1 wherein said transparent coating includes a plurality of particles dispersed therein to enhance the metallic appearance of said coated housing.

17. The coated housing of claim 16 wherein said particles comprise flakes of material selected from metal and mica.

18. The coated housing of claim 17 wherein said metal flakes comprise aluminum.

19. The coated housing of claim 17 wherein said metal flakes comprise flakes oriented in a predetermined pattern in said coating.

20. The coated housing of claim 17 wherein said metal flakes comprise flakes oriented generally parallel to said outside surface of said housing.

21. The coated housing of claim 1 wherein said resinous plastic material includes a plurality of particles mixed therein prior to molding, said particles being visible in said outside surface after molding such that the metallic appearance of said coated housing is enhanced.

22. A coated housing for exterior rearview mirrors for vehicles comprising:

a molded housing having an outside surface and an inside surface, said outside surface being exposed and visible from the vehicle exterior, said housing being adapted to house a reflective rearview mirror element when mounted on a vehicle, said housing being molded from a resinous plastic material of a predetermined color and being unpainted; and a coating of transparent polymeric material on at least a portion of said outside housing surface, said transparent polymeric material having a refractive index from about 1.35 to about 1.67 measured at the sodium D line and at 20° C., and having at least one of a tint compound and a pigmentation in a desired color to enhance the color of said resinous plastic material of said housing, whereby said coated outside housing surface portion of said exterior rearview mirror has at least one of enhanced scratch resistance, enhanced resistance to surface crazing, increased resistance to ultraviolet radiation degradation, increased gloss and increased depth of color in appearance as compared to said housing when uncoated with said coating.

23. The coated housing of claim 22 wherein said tint compound is matched to the color of said resinous plastic material of said housing.

24. The coated housing of claim 23 wherein said resinous plastic material includes a plurality of particles mixed therein prior to molding, said particles being visible in said outside surface after molding such that the metallic appearance of said coated housing is enhanced.

25. The coated housing of claim 23 wherein said resinous plastic material includes an adhesion promoting agent mixed therein prior to molding of said housing, said agent providing increased adhesion of said transparent coating to said housing.

26. The coated housing of claim 23 wherein said exterior surface of said housing is treated after molding but before application of said transparent polymeric coating to enhance adhesion of said coating to said outside surface.

27. The coated housing of claim 22 wherein said transparent polymeric material also has incorporated therein at least one ultraviolet radiation absorbing, blocking or screening additive to resist ultraviolet radiation degradation of said resinous plastic material of said housing.

28. The coated housing of claim 27 wherein said ultraviolet radiation absorbing material, blocking or screening additive comprises a benzotriazole.

29. The coated housing of claim 22 wherein said coating has a thickness in the range of between about 25 to 50 microns.

30. The coated housing of claim 29 wherein said resinous plastic material of said housing is selected from the group consisting of polycarbonate/polyethylene terephthalate blend, acrylonitrile butadiene styrene copolymer, acrylonitrile/styrene/acrylate, and nylon.

31. The coated housing of claim 22 wherein said resinous plastic material includes an adhesion promoting agent mixed therein prior to molding of said housing, said agent providing increased adhesion of said transparent coating to said housing.

32. The coated housing of claim 31 wherein said adhesion promoting agent comprises a bisphenol derivative.

33. The coated housing of claim 22 wherein said outside surface of said housing is treated after molding but before application of said transparent polymeric coating to enhance adhesion of said coating to said outside surface.

34. The coated housing of claim 22 wherein said outside surface is modified prior to application of said transparent coating using a treatment selected from corona surface treatment, plasma surface modification, and chemical surface treatment.

35. The coated housing of claim 22 wherein said tint compound is provided by a pigmentation.

36. The coated housing of claim 22 wherein said resinous plastic material of said housing is selected from the group consisting of polycarbonate/polyethylene terephthalate blend, acrylonitrile butadiene styrene copolymer, acrylonitrile/styrene/acrylate, and nylon.

37. The coated housing of claim 36 wherein said coating layer includes an ultraviolet radiation absorbing material.

38. The coated housing of claim 22 wherein said transparent coating includes a plurality of particles dispersed therein to enhance the metallic appearance of said coated housing.

39. The coated housing of claim 38 wherein said particles comprise flakes of material selected from metal and mica.

40. The coated housing of claim 39 wherein said metal flakes comprise aluminum.

41. The coated housing of claim 39 wherein said metal flakes comprise flakes oriented in a predetermined pattern in said coating.

42. The coated housing of claim 39 wherein said metal flakes comprise flakes oriented generally parallel to said outside surface of said housing.

43. The coated housing of claim 22 wherein said resinous plastic material includes a plurality of particles mixed therein prior to molding, said particles being visible in said outside surface after molding such that the metallic appearance of said coated housing is enhanced.

* * * * *

UNITED STATES PATENT AND TRADEMARK OFFICE
CERTIFICATE OF CORRECTION

PATENT NO.    : 6,150,014
DATED         : November 21, 2000
INVENTOR(S)   : Tun-Jen Chu et al.

It is certified that error appears in the above-identified patent and that said Letters Patent is hereby corrected as shown below:

Column 5,
Line 56, delete "The transparent polymeric material has a refractive index in the range of about 1.35 to about 1.67 measured at the sodium D line and $20^0C$."

Column 6
Line 2, after "housing 12." insert -- the transparent polymeric material has a refractive index in the range of about 1.35 to about 1.67 measured at the sodium D line and $20^0C$.--

Signed and Sealed this

Twenty-eighth Day of August, 2001

Attest:

NICHOLAS P. GODICI
Attesting Officer   Acting Director of the United States Patent and Trademark Office